(12) United States Patent
Huang

(10) Patent No.: US 12,008,993 B2
(45) Date of Patent: Jun. 11, 2024

(54) VOICE COLLABORATIVE AWAKENING METHOD AND APPARATUS, ELECTRONIC DEVICE AND STORAGE MEDIUM

(71) Applicants: Beijing Xiaomi Mobile Software Co., Ltd., Beijing (CN); Beijing Xiaomi Pinecone Electronics Co., Ltd., Beijing (CN)

(72) Inventor: Zhuliang Huang, Beijing (CN)

(73) Assignees: BEIJING XIAOMI MOBILE SOFTWARE CO., LTD., Beijing (CN); BEIJING XIAOMI PINECONE ELECTRONICS CO., LTD., Beijing (CN)

( * ) Notice: Subject to any disclaimer, the term of this patent is extended or adjusted under 35 U.S.C. 154(b) by 379 days.

(21) Appl. No.: 17/646,640

(22) Filed: Dec. 30, 2021

(65) Prior Publication Data

US 2023/0054011 A1 Feb. 23, 2023

(30) Foreign Application Priority Data

Aug. 20, 2021 (CN) .......................... 202110961834.9

(51) Int. Cl.
*G10L 15/22* (2006.01)
*G10L 15/00* (2013.01)
*G10L 15/30* (2013.01)

(52) U.S. Cl.
CPC ........ *G10L 15/22* (2013.01); *G10L 2015/223* (2013.01)

(58) Field of Classification Search
None
See application file for complete search history.

(56) References Cited

U.S. PATENT DOCUMENTS 10,536,287 B1 1/2020 Leblang et al.
11,361,756 B2 * 6/2022 Smith ..................... G10L 15/22
(Continued)

FOREIGN PATENT DOCUMENTS

CN 108520743 A * 9/2018 ............. G10L 15/22
CN 109243431 A * 1/2019 ........... G06F 40/237
(Continued)

*Primary Examiner* — Shreyans A Patel
(74) *Attorney, Agent, or Firm* — McCoy Russell LLP

(57) ABSTRACT

A method can include: generating a first awakening request and transmitting the first awakening request to a server responsive to a voice awakening event; receiving a second awakening request transmitted by a second intelligent device, where the second awakening request is generated by the second intelligent device which transmits the second awakening request responsive to the voice awakening event; if a decision-making condition is met, generating a first awakening result according to a preset decision-making rule and transmitting the first awakening result to each intelligent device; if the first awakening result is generated, performing awakening or inhibiting awakening according to the second awakening result after receiving a second awakening result returned by the server according to the first awakening request and the second awakening request; and if the first awakening result is generated, performing awakening or inhibiting awakening according to the first awakening result before receiving the second awakening result.

20 Claims, 7 Drawing Sheets

(56) References Cited

U.S. PATENT DOCUMENTS

| | | | |
|---|---|---|---|
| 11,568,868 B2* | 1/2023 | Gao | H04L 12/12 |
| 2018/0247645 A1* | 8/2018 | Li | G06F 3/167 |
| 2019/0130908 A1 | 5/2019 | Bang | |
| 2019/0355365 A1 | 11/2019 | Kim et al. | |
| 2020/0005789 A1 | 1/2020 | Chae | |
| 2020/0265838 A1 | 8/2020 | Lee et al. | |

FOREIGN PATENT DOCUMENTS

| | | | | |
|---|---|---|---|---|
| CN | 109391528 A | | 2/2019 | |
| CN | 110322878 A | | 10/2019 | |
| CN | 111048086 A | | 4/2020 | |
| CN | 111312250 A | * | 6/2020 | |
| CN | 111901210 A | * | 11/2020 | |
| CN | 112037787 A | | 12/2020 | |
| CN | 112289313 A | | 1/2021 | |
| CN | 112634872 A | * | 4/2021 | G10L 15/02 |
| CN | 112837686 A | | 5/2021 | |
| CN | 113077790 A | * | 7/2021 | G10L 15/005 |
| WO | WO-2020073839 A1 | * | 4/2020 | G10L 15/02 |
| WO | 2021000876 A1 | | 1/2021 | |
| WO | WO-2021000876 A1 | * | 1/2021 | G10L 15/22 |

* cited by examiner

VOICE COLLABORATIVE AWAKENING METHOD AND APPARATUS, ELECTRONIC DEVICE AND STORAGE MEDIUM

CROSS-REFERENCE TO RELATED APPLICATION

The present application claims priority to Chinese Patent Application No. 202110961834.9, filed on Aug. 20, 2021. The entire contents of the above-listed application are hereby incorporated by reference for all purposes.

BACKGROUND

With the development of technologies, smart home devices are applied more and more widely, such as an intelligent air conditioner, an intelligent refrigerator, a television and other intelligent devices. The intelligent device may interact with a user in a voice awakening manner.

SUMMARY

The disclosure relates to the field of communication, and in particular, to a voice collaborative awakening method and apparatus, an electronic device and a storage medium.

In order to overcome the problems existing in related art, the disclosure provides a voice collaborative awakening method and apparatus, an electronic device and a storage medium.

According to a first aspect of examples of the disclosure, a voice collaborative awakening method is provided. The method is applied to a first intelligent device of a plurality of intelligent devices and includes:

generating, a first awakening request and transmitting the first awakening request to a server, in response to a voice awakening event;

receiving, a second awakening request transmitted by at least one second intelligent device, where each second awakening request is generated by the second intelligent device for transmitting the second awakening request in response to the voice awakening event;

generating, a first awakening request according to a preset decision-making rule, and, transmitting the first awakening result to each intelligent device, when a decision-making condition is met;

discarding, the first awakening result, and performing awakening or inhibiting awakening according to the second awakening result, when the first awakening result is generated, after receiving a second awakening request returned by the server according to the first awakening request and the second awakening request;

performing, awakening or inhibiting awakening according to the first awakening result, when the first awakening result is generated, before receiving the second awakening result.

According to a second aspect of the examples of the disclosure, a voice collaborative awakening method is provided. The method is applied to a second intelligent device of a plurality of intelligent devices and includes:

generating, a second awakening request, in response to a voice awakening event;

transmitting, the second awakening request to a first intelligent device and a server;

receiving, a first awakening result transmitted by the first intelligent device and receiving a second awakening result transmitted by the server, where the first awakening result is generated by the first intelligent device according to the generated first awakening request, the second wakening request and the preset decision-making rule when a decision-making condition is met, and the second awakening result is generated by the server according to the second awakening request, the first awakening request and the preset decision-making rule;

discarding, the second awakening result, and performing awakening or inhibiting awakening according to the first awakening result, when the first awakening result is received and then the second awakening result is received;

performing, awakening or inhibiting awakening according to the second awakening result, when the second awakening result is received and then the first awakening result is received.

According to a third aspect of the examples of the disclosure, a voice collaborative awakening method is provided. The method is applied to a server and includes:

receiving, a first awakening request transmitted by a first intelligent device and a second awakening request transmitted by a second intelligent device, where the first awakening request is generated by the first intelligent device in response to a voice awakening event, and the second awakening request is generated by the second intelligent device in response to the voice awakening event;

generating, a second awakening result according to a preset decision-making rule, when a decision-making condition is met;

transmitting, the second awakening result to the first intelligent device and the second intelligent device, where the second intelligent device also receives a first awakening result, and the first awakening result is generated by the first intelligent device according to the generated first awakening request, the second awakening request and the preset decision-making rule when the decision-making condition is met.

According to a fourth aspect of the examples of the disclosure, an electronic device is provided. The electronic device includes:

a processor;

a memory, configured to store processor executable instructions;

where the processor is configured to perform the voice collaborative awakening method as described in any one of the above.

It should be understood that the above general description and the following detailed description are only exemplary and explanatory, and cannot limit the disclosure.

BRIEF DESCRIPTION OF THE FIGURES

The accompanying drawings herein are incorporated into the specification and constitute a part of the specification, illustrate examples consistent with the present disclosure, and are used to explain the principle of the present disclosure together with the specification.

DETAILED DESCRIPTION

Figure 1:
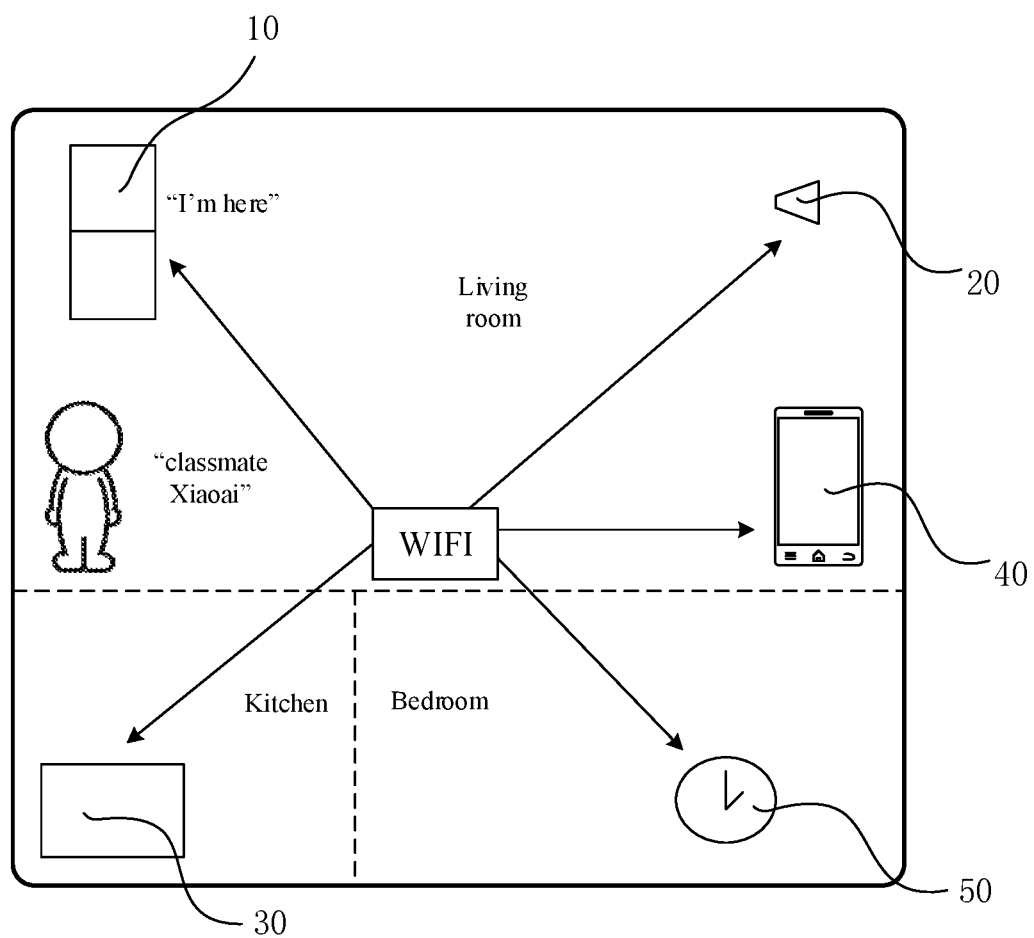
FIG. 1 is a schematic diagram of an application scenario according to an embodiment of the present disclosure.

Exemplary examples will be described in detail here, and examples thereof are shown in the accompanying drawings. When the following descriptions refer to the drawings, the same numbers in different drawings indicate the same or similar elements, unless otherwise indicated. The implementation manners described in the following exemplary examples do not represent all implementation manners consistent with the present disclosure. Instead, they are merely examples of apparatuses and methods consistent with some aspects of the present disclosure.

With the development of technologies, smart home devices are applied more and more widely, such as an intelligent air conditioner, an intelligent refrigerator, a television and other intelligent devices. The intelligent device may interact with a user in a voice awakening manner. The related art has a problem that a plurality of intelligent devices are awakened at the same time, for example, when a user calls out an awakening word, a plurality of devices in a current space answer at the same time.

In related art, after voice transmitted by a user is received, each intelligent device may make decisions independently. The intelligent device determines whether to respond to the voice according to its own decision result. Therefore, after each intelligent device makes decision independently according to its own situation, a plurality of devices will respond at the same time.

In addition, in the way of making unified decision by a server, due to network anomaly and other reasons, it may cause the problem that the decision result cannot be transmitted timely. Therefore, the decision result cannot be transmitted to an answering device timely to affect the efficiency and accuracy of voice awakening.

In order to solve the problems in related art, the examples of the disclosure provides a voice collaborative awakening method. The method is applied to a first intelligent device of a plurality of intelligent devices and includes: in response to a voice awakening event, generating a first awakening request and transmitting the first awakening request to a server; receiving a second awakening request transmitted by at least one second intelligent device, where each second awakening request is generated by the second intelligent device which transmits the second awakening request in response to the voice awakening event; if a decision-making condition is met, generating a first awakening result according to a preset decision-making rule and transmitting the first awakening result to each intelligent device; if the first awakening result is generated, after receiving a second awakening result returned by the server according to the first awakening request and the second awakening request, discarding the first awakening result and performing awakening or inhibiting awakening according to the second awakening result; and if the first awakening result is generated, performing awakening or inhibiting awakening according to the first awakening result before receiving the second awakening result. In the method provided by the disclosure, after voice of a user is received, the server and the first intelligent device may make centralized decision for a plurality of intelligent devices respectively and determine to perform awakening or inhibit awakening according to the awakening result, thereby effectively improving the phenomenon of simultaneous response of the plurality of intelligent devices. Meanwhile, the server and the first intelligent device may determine and transmit control strategies respectively, thereby improving the phenomenon that the decision result is not transmitted timely due to the network anomaly and other reasons.

Referring to FIG. 1, the application scenario of the examples of the disclosure may be: in a voice collaborative awakening system, a plurality of intelligent devices are included, and the plurality of intelligent devices are connected to the server respectively. The plurality of intelligent devices may respectively be: an intelligent refrigerator 10, a monitoring device 20, an intelligent speaker 30, a mobile terminal 40 and an intelligent clock 50. After voice such as "classmate Xiaoai" of a user is received, the system may make decision according to the voice of the user to awaken a certain intelligent device. For example, the intelligent refrigerator 10 in FIG. 1 may answer awakening "I'm here", and other intelligent devices inhibit awakening, that is, the decision does not answer this voice. The plurality of intelligent devices may be regarded as a group, and the plurality of intelligent devices in each group may be connected based on the same wireless network and log in with the same account information (uid).

In an exemplary example, the voice collaborative awakening method in this example is applied to a first intelligent device. The first intelligent device is a decision-making device selected from a plurality of intelligent devices, and the non-decision-making device in the plurality of intelligent devices is recorded as a second intelligent device.

The selection mode, for example, may be: a plurality of intelligent devices communicate with each other and communicate performance information to take the intelligent device with the best performance information as the first intelligent device. For example, in the voice collaborative wakening system, local comparison is performed according to the device information of each intelligent device, and the intelligent device with the best performance is determined as the first intelligent device. For example, the plurality of intelligent devices are respectively an intelligent refrigerator, a monitoring device, an intelligent speaker and a mobile terminal. A control end determines that the use performance and the control performance of the mobile terminal are better according to the device information of each intelligent device, and determines the mobile terminal as the first intelligent device.

Or the server acquires performance information of each intelligent device and sorts the plurality of intelligent devices according to the performance information, and the intelligent device with the best performance firstly serves as the first intelligent device. The intelligent devices may be selected in turns as the first intelligent device according to the performance information order of the intelligent devices at a preset time interval. In this mode, each intelligent device may learn whether it is the first intelligent device based on a notification message of the voice collaborative awakening system or the server.

Figure 2:
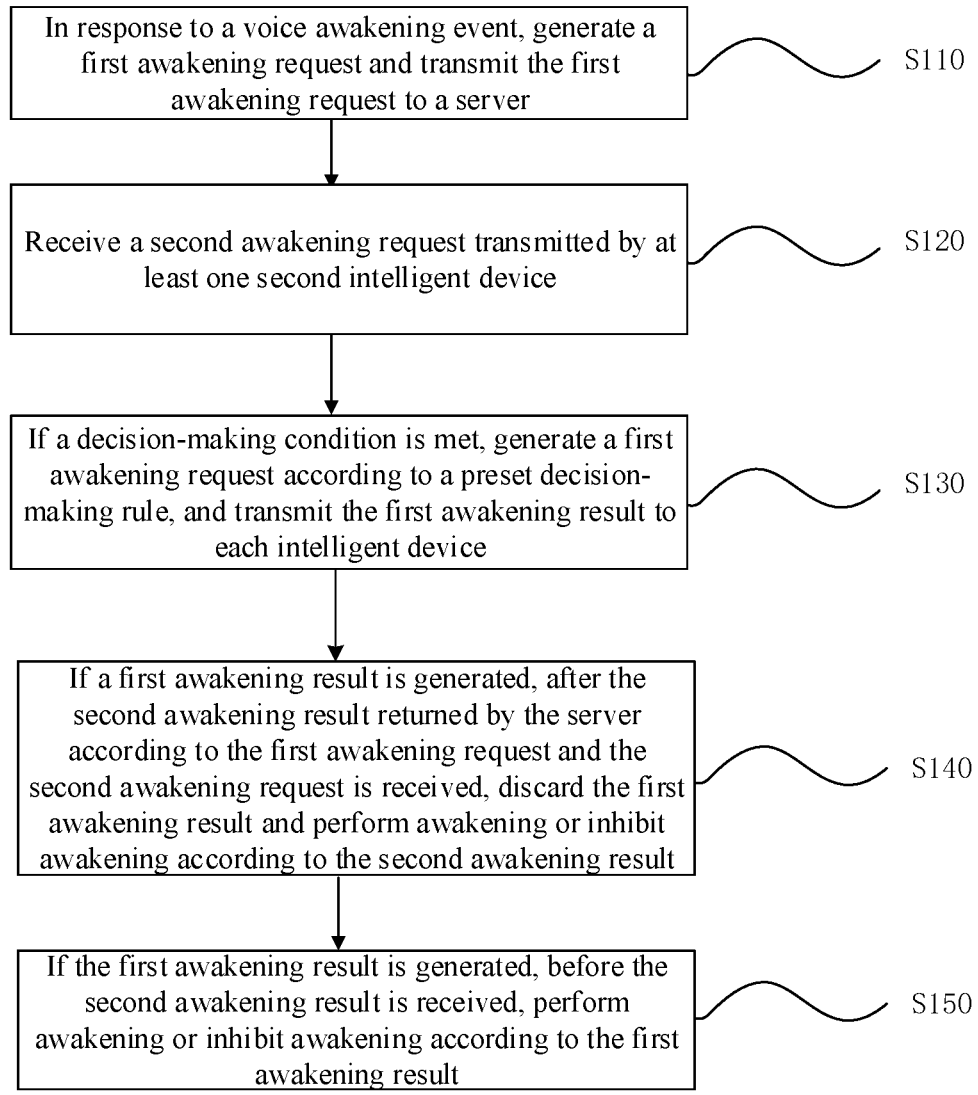
FIG. 2 is a flowchart of a method according to an embodiment of the present disclosure.

As shown in FIG. 2, the method in this example may include the following steps:

S110: in response to a voice awakening event, generating a first awakening request and transmitting the first awakening request to a server;

S120: receiving a second awakening request transmitted by at least one second intelligent device;

S130: if a decision-making condition is met, generating a first awakening result according to a preset decision-making rule, and transmitting the first awakening result to each intelligent device;

S140: if the first awakening result is generated, after receiving a second awakening result returned by the server according to the first awakening request and the second awakening request, discarding the first awakening result, and performing awakening or inhibiting awakening according to the second awakening result; and S150: if the first awakening result is generated, before the second awakening result is received, performing awakening or inhibiting awakening according to the first awakening result.

In step S110, in the environment where the plurality of intelligent devices are located, when the first intelligent device detects or receives a voice awakening word sent by a user, the first intelligent device determines that a voice awakening event exists. The voice awakening word may be a greeting defined by a user, or an awakening word set by the intelligent device in the factory process, such as "classmate Xiaoai". When an awakening event exists, each intelligent device may enter a status waiting for response, the first intelligent device may generate a first awakening request and the second intelligent device may generate a second awakening request.

In the step, the first awakening request or the second awakening request may include: device information corresponding to the intelligent device, and an operation result based on the voice awakening event. Each intelligent device may be integrated with a voice awakening related algorithm. According to the received voice awakening word, each intelligent device may calculate the operation result in combination with the algorithm, and the operation result represents the current voice energy value of the intelligent device or a distance value from a user.

The first intelligent device may transmit the first generated awakening request to the server based on communication connection.

In step S120, each second awakening request is generated by the second intelligent device for transmitting the second awakening request in response to the voice awakening event, that is, each second intelligent device will generate a corresponding second awakening request based on the voice awakening event.

In combination with the description of step S110, the second awakening request includes: device information corresponding the second intelligent device, and an operation result (representing a voice energy value or a distance value from a user) based on the voice awakening event.

After each second intelligent device generates a corresponding second awakening request, the second awakening request may be transmitted to the first intelligent device and the server.

In step S130, the decision-making condition, for example, may include a decision-making time condition or a quantity condition of receiving the awakening requests. A preset decision-making rule may determine the awakening device or the awakening inhibiting device according to the performance of the plurality of intelligent devices.

When the decision-making condition is met, the first intelligent device generates a first awakening result according to a first awakening request generated by the first intelligent device, a second awakening request transmitted by the second intelligent device, and the preset decision-making rule. The first intelligent device transmits the generated first awakening result to each second intelligent device respectively.

In step S140, the first intelligent device not only can generate the first awakening result, but also can receive the second awakening result transmitted by the server. After the server receives the awakening requests of all the intelligent devices, or a preset receiving duration (such as 300 ms) is reached, centralized decisions may be made to generate the second awakening result based on the awakening request (the first awakening request and the second awakening request) of each intelligent device and the preset decision-making rule.

The first intelligent device may determine to execute which awakening result according to the order of the first awakening result and the second awakening result. In this step, if the first intelligent device generates the first awakening result after receiving the second awakening result, the first intelligent device may discard or ignore the first awakening result to perform awakening or inhibit awakening based on the second awakening result.

In step S150, if the first intelligent device generates the first awakening result before receiving the second awakening result, the first intelligent device may ignore the second awakening result to perform awakening or inhibit awakening based on the first awakening result generated by itself.

In the example of the disclosure, the first intelligent device and the server may serve as decision-making ends (server) respectively, and may make centralized decision according to the awakening request transmitted by the intelligent device to determine the awakening result and improve the phenomenon of simultaneous awakening. Furthermore, the control strategies of the two decision-making ends form double insurance. The local area network and the public network are generally not abnormal at the same time. One of the control strategies of the server end or the first intelligent device end still may be transmitted normally, thereby improving the phenomenon of awakening delay or no awakening.

In an exemplary example, the first awakening request in this example includes a unique identification of the first intelligent device, and the second awakening request includes a unique identification of the second intelligent device.

In this example, the method for determining whether the decision-making condition is met may include the following steps:

S11: determine a unique identification of each second intelligent device according to the received second awakening request; and S12: if the unique identification of each second intelligent device is correspondingly matched with a pre-stored reference identification, determining that the decision-making condition is met.

In step S11, the first intelligent device may determine the corresponding second intelligent device according to the unique identification of the second awakening request. In addition, the server may determine the corresponding first intelligent device according to the unique identification of the first awakening request; and the corresponding second intelligent device may be determined according to the unique identification of the second awakening request.

In step S12, a reference identification may be pre-stored in the first intelligent device. The reference identification includes a plurality of identifications corresponding to a plurality of intelligent devices in the voice collaborative awakening system.

After the first intelligent device analyzes the unique identification of the second device according to the received second awakening request, the unique identification may be matched with the reference identification through compared. If the identifications of the plurality of second intelligent devices are in one-to-one correspondence with the corresponding identification in the reference identification, it indicates that the awakening request of all other intelligent devices have been received, and the first intelligent device determines that the decision-making condition is met, and the step S130 may be performed.

In an exemplary example, the method for determining whether the decision-making condition is met in this example further may include the following steps:

S13: if the time of receiving the second awakening request exceeds a preset duration, determining that the decision-making condition is met.

In this example, the first intelligent device starts timing in a receiving status, for example, the time of receiving a first second awakening request is the initial time, if the time of receiving the second awakening request exceeds a preset duration (such as 300 ms), it is considered as timeout, it is determined that the condition-making condition is met, and the step S130 may be performed.

In combination with the two examples for determining that the decision-making condition is met, a Judge service module is integrated in the first intelligent device. The first intelligent device may start to make decision after receiving the awakening requests of all other intelligent devices, or may also start to make decision after the preset receiving duration (such as 300 ms) is reached. In addition, the decision-making conditions and the decision-making rules in the first intelligent device and the server may be the same, so that the same awakening result may be determined in parallel.

In an exemplary example, the first awakening request and the second awakening request both include a voice energy value, and the voice energy value is used to indicate sound energy of voice detected by a current device.

The preset decision-making rule is: according to voice energy values in the first awakening request and each received second awakening request, the intelligent device corresponding to the awakening request with a maximum voice energy value is selected as an awakening device, and other intelligent devices serve as awakening inhibiting devices.

In this example, the first intelligent device generates the first awakening request according to the voice awakening event, so the voice energy value in the first awakening request represents: the sound energy of the user voice detected by the first intelligent device. The second intelligent device generates a second awakening request according to the voice awakening event, so the voice energy value in the second awakening request represents: the sound energy of the user voice detected by the second intelligent device.

It indicates that the higher the sound energy is, the closer the distance between the device and a user (sound source) is. The decision-making rule is intended to select the device closest to the user as the awakening device, and the other devices may serve as the awakening inhibiting devices.

In an exemplary example, the step S130 in this example may include the following steps:

S1301: transmitting first awakening response data to the awakening device; and

S1302: transmitting first awakening inhibiting data to the awakening inhibiting device.

In step S1301, the first awakening result includes first awakening response data. The first intelligent device may transmit the first awakening response data to the awakening device after determining the awakening device according to the preset decision-making rule. Therefore, the awakening device may perform awakening on the voice awakening event for answering.

In step S1302, the first awakening result further includes first awakening inhibiting data. The first intelligent device may transmit the first awakening inhibiting data to the awakening device after determining the awakening inhibiting device according to the preset decision-making rule. Therefore, the awakening inhibiting device performs awakening inhibition on the voice awakening event not to answer.

It may be understood that in other examples, the first intelligent device may also serve as an awakening device or an awakening inhibiting device. At this time, the first intelligent device may obtain the corresponding data based on the analysis in the first awakening result determined by itself.

In an exemplary example, the example of the disclosure provides a voice collaborative awakening method, which is applied to the second intelligent device of the aforementioned voice collaborative awakening system. The second intelligent device cannot make decision relative to the first intelligent device.

Figure 3:
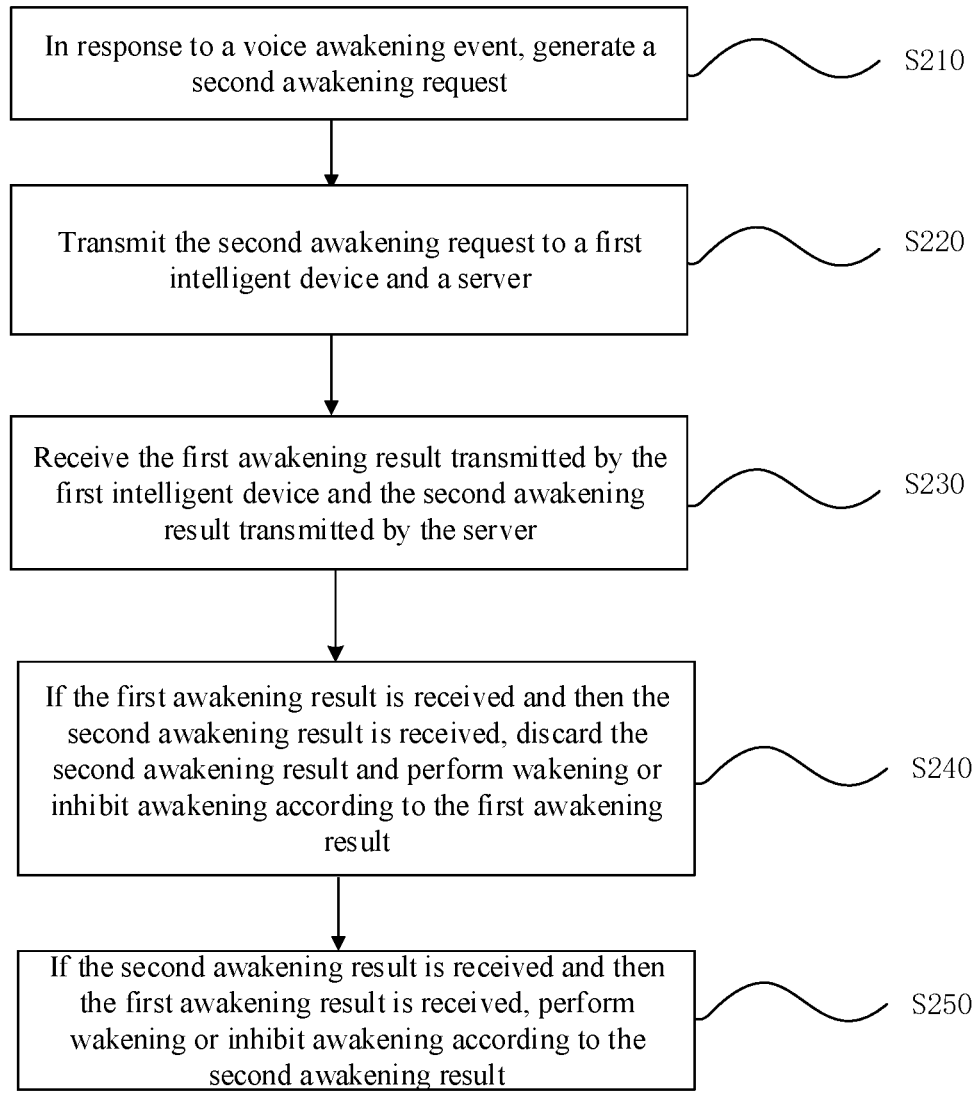
FIG. 3 is a flowchart of a method according to an embodiment of the present disclosure.

As shown in FIG. 3, the method of this example may include the following steps:

S210: in response to a voice awakening event, generating a second awakening request;

S220: transmitting the second awakening request to a first intelligent device and a server;

S230: receiving a first awakening result transmitted by the first intelligent device and a second awakening result transmitted by the server;

S240: if the first awakening result is received and then the second awakening resulting is received, discarding the second awakening result, and performing awakening or inhibiting awakening according to the first awakening result; and S250: if the second awakening result is received and then the first awakening result is received, performing awakening or inhibiting awakening according to the second awakening result.

In step S210, in combination with the scenario in FIG. 1, when a user sends out a voice awakening word such as "classmate Xiaoai", the second intelligent device determines that a voice awakening event exists. In response to the event, the second intelligent device may generate a second awakening request.

In step S220, the second intelligent device transmits the generated second awakening request to the first intelligent device and the server respectively.

In step S230, the first awakening result is generated by the first intelligent device according to the generated first awakening request, the second awakening request and the preset decision-making rule when the decision-making condition is met. The second awakening result is generated by the server according to the second awakening request, the first awakening request and the preset decision-making rule.

In this step, the first intelligent device and the server make decision in parallel to obtain the first awakening result and the second awakening result respectively. The second intelligent device may receive the first awakening result and the second awakening result.

In step S240, the time of determining the awakening result and transmitting the awakening result by the server and the first intelligent device respectively may be the same, or may also be different. Therefore, if the awakening results transmitted by the server and the first intelligent device are received at the same time, any control strategy may be selected for analysis, and an instruction included in the control strategy may be executed.

In this step, if the receiving time is different, the second intelligent device may determine to perform which awakening result according to the order of the received first awakening result and second awakening result.

In this step, if the second intelligent device receives the first awakening result transmitted by the first intelligent device and then receives the second awakening result, a corresponding operation may be performed according to the first awakening result and the second awakening result may be ignored.

In step S250, if the second intelligent device receives the second awakening result transmitted by the server and then receives the first awakening result transmitted by the first intelligent device, a corresponding operation may be performed according to the second awakening result, and the first awakening result may be ignored.

In an exemplary example, the first awakening result includes a unique identification of the first intelligent device, and the second awakening request includes a unique identification of the second intelligent device.

In this example, the second awakening request transmitted by the second intelligent device includes a corresponding unique identification, so that when the first intelligent device or the server makes decision according to the two awakening requests, the corresponding second intelligent device may be determined, thereby facilitating accurate decision making and accurate transmission of a notification message.

In an exemplary example, the first awakening request and the second awakening request both include a voice energy value, and the voice energy value is used to indicate sound energy of voice detected by a current device.

The preset decision-making rule is: according to voice energy values in the first awakening request and each received second awakening request, the intelligent device corresponding to the awakening request with a maximum voice energy value is selected as an awakening device, and other intelligent devices serve as awakening inhibiting devices.

In this example, the decision-making rules adopted by the first intelligent device and the server may be the same, so that the same awakening result is obtained. According to the first awakening result or the second awakening result, the device in the first intelligent device and the second intelligent device closest to the user may serve as the awakening device, and the other intelligent devices may serve as awakening inhibiting devices.

In an exemplary example, the step S230 in this example may include the following steps:
  S2301: if it is an awakening device, receiving first awakening response data transmitted by the first intelligent device; and
  S2302: if it is an awakening inhibiting device, receiving first awakening inhibiting data transmitted by the first intelligent device.

In step S2301, the first awakening result generated by the first intelligent device includes first awakening response data. When transmitting the first awakening result, the first intelligent device may transmit the first awakening response data for the awakening device in combination with the determined awakening device and the corresponding identification. Therefore, the awakening device may respond to the voice awakening event.

In step S2302, the first awakening result generated by the first intelligent device further includes first awakening inhibiting data. The first intelligent device transmits the first awakening inhibiting data for the awakening inhibiting device. Therefore, the awakening inhibiting device may inhibit awakening for the voice awakening event, that is, it is decided not to answer.

In an exemplary example, the step S230 in this example may further include the following steps:
  S2303: if it is an awakening device, receiving second awakening response data; and
  S2304: if it is an awakening inhibiting device, receiving second awakening inhibiting data.

In S2303, the second awakening result generated by the server includes second awakening response data. The server may transmit the second awakening response data for the awakening device in combination with the determined awakening device and the corresponding unique. Therefore, the awakening device may respond to the voice awakening event.

In S2304, the second awakening result includes second awakening inhibiting data. The server transmits the second awakening inhibiting data for the awakening inhibiting device. Therefore, the awakening inhibiting device may inhibit awakening for the voice awakening event, that is, it is decided not to answer.

In an exemplary example, the example of the disclosure further provides a voice collaborative awakening method, which is applied to a server. A Judge service module is integrated in the server. The server is connected to a plurality of intelligent devices through communication. The connection manner may be referenced to the above examples, which will not be elaborated here. Meanwhile, in combination with the above examples, the plurality of intelligent devices belong to one group, including: a first intelligent device and a second intelligent device capable of making decision.

Figure 4:
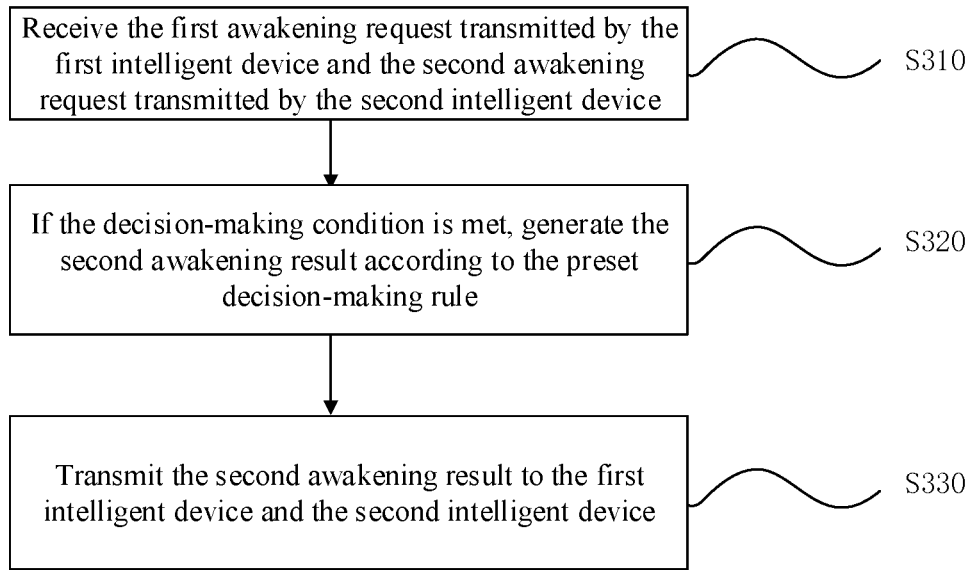
FIG. 4 is a flowchart of a method according to an embodiment of the present disclosure.

As shown in FIG. 4, the method in this example may include the following steps:
  S310: receiving a first awakening request transmitted by the first intelligent device and a second awakening request transmitted by the second intelligent device;
  S320: if a decision-making condition is met, generating a second awakening result according to a preset decision-making rule; and
  S330: transmitting the second awakening result to the first intelligent device and the second intelligent device.

In step S310, the first awakening request is generated by the first intelligent device in response to the voice awakening event, and the second awakening request is generated by the second intelligent device in response to the voice awakening event. The server receives the awakening request of two devices.

The first awakening request or the second awakening request may include: device information corresponding to the intelligent device, and an operation result based on the voice awakening event. Each intelligent device may be integrated with a voice awakening related algorithm. According to the received voice awakening word, each intelligent device may calculate the operation result in combination with the algorithm, and the operation result represents the current voice energy value of the intelligent device or a distance value from a user.

In step S320, the decision-making condition and the decision-making rule may be respectively as same as the decision-making condition set in the first intelligent device. The decision-making condition, for example, may include a decision-making time condition or a quantity condition of receiving the awakening requests. A preset decision-making rule may determine the awakening device or the awakening inhibiting device according to the performance of the plurality of intelligent devices.

In step S330, the second awakening result generated by the server will be transmitted to the first intelligent device and the second intelligent device respectively.

In this step, the second intelligent device also receives the first awakening result. The first awakening result is generated by the first intelligent device according to the generated first awakening request, the second awakening request and the preset decision-making rule when the decision-making condition is met.

In an exemplary example, the first awakening result includes a unique identification of the first intelligent device, and the second awakening request includes a unique identification of the second intelligent device.

In this example, the method for determining whether the decision-making condition is met may include the following steps:
  S31: according to the received first awakening request and the second awakening request, determining a unique identification of the first intelligent device and a unique identification of the second intelligent device; and
  S32: if each determined unique identification is respectively matched with a pre-stored reference identification, determining that the decision-making condition is met.

In step S31, the server may determine a unique identification corresponding to each intelligent device according to the corresponding awakening request.

In step S32, reference identifications are stored in the server. The reference identification includes a plurality of identifications corresponding to a plurality of intelligent devices in the voice collaborative awakening system. If the identifications of the intelligent device analyzed by the server according to the step S31 can be in one-to-one correspondence with the identifications in the reference identifications, it indicates that the server has received the awakening requests of all the intelligent devices and determined that the decision-making condition is met. Step S320 may be performed.

In an exemplary example, the method for determining whether the decision-making condition is met in this example further may include the following steps:
  S33: if the time of receiving the first awakening request and the second awakening request exceeds a preset duration, determining that the decision-making condition is met.

In this example, the server starts timing in a receiving status, for example, the time of receiving a first awakening request is the initial time, if the time of receiving the subsequent awakening request exceeds a preset duration (such as 300 ms), it is considered as timeout, and it is determined that the condition-making condition is met. Step S320 may be performed.

In an exemplary example, the first awakening request and the second awakening request both include position information, and the position information is used to indicate distance information between a current device and a user.

The preset decision-making rule is: according to position information in the first awakening request and each received second awakening request, the intelligent device corresponding to the awakening request with minimum distance information is selected as an awakening device, and other intelligent devices serve as awakening inhibiting devices.

In this example, each intelligent device generates a corresponding awakening request based on a voice awakening event of a user. In combination with the above examples, the awakening request includes a distance value obtained through operation of a voice receiving event, or position information. Therefore, distance information between the corresponding device and a user may be learned. This example is intended to select the device closest to the user as an awakening device.

Each intelligent device may be combined with the received voice determining distance, and a distance sensor (such as an infrared sensor) may be arranged in the intelligent device. When a voice awakening event exists, the awakening request generated by the intelligent device may include distance information.

In an exemplary example, the step S330 in this example may include the following steps:
  S3301: transmitting second awakening response data to the awakening device; and
  S3302: transmitting second awakening inhibiting data to the awakening inhibiting device.

In step S3301, the second awakening result includes second awakening response data. The server may determine the awakening device in the first intelligent device and the second intelligent device according to the decision-making rule. Second awakening response data is transmitted to the awakening device, so that the awakening device may perform awakening on the voice awakening event for answering.

In step S3302, the second awakening result further includes second awakening inhibiting data. The server transmits second awakening inhibiting data to the awakening inhibiting device, so that the awakening inhibiting device performs awakening inhibition on the voice awakening event not to answer.

In combination with the above examples of the disclosure, the server and the first intelligent device in the disclosure may serve as decision-making ends respectively and make decision respectively in a centralized decision-making manner to form a double decision-making mode, and the advantages of distributed decision making are combined. The server end belongs to a cloud end, and the first intelligent device belongs to the local area. Control strategies are determined respectively at the server end and the first intelligent device, and are transmitted to the intelligent device respectively, so that the problem of simultaneous awakening caused by the distributed decision making is effectively improved. In addition, the local area network and the public network are generally not abnormal at the same time. One of the control strategies of the server end or the first intelligent device end still may be transmitted normally, thereby improving the phenomenon of awakening delay or no awakening.

Figure 5:
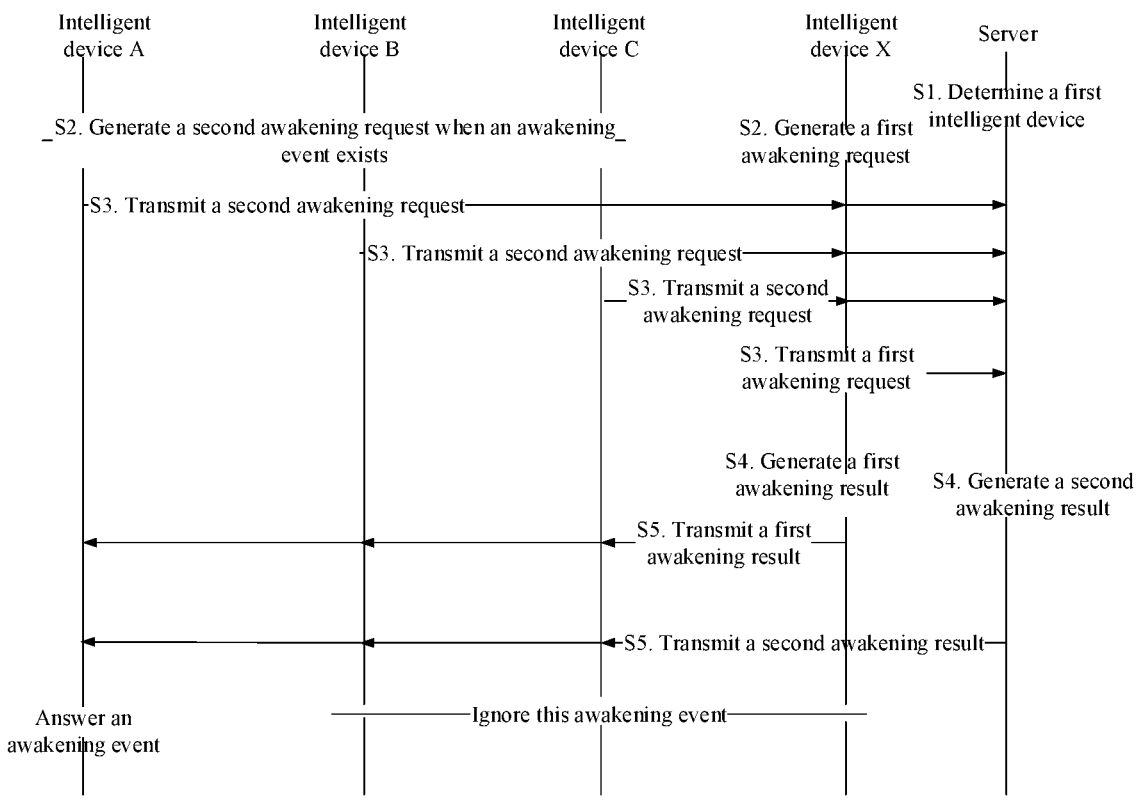
FIG. 5 is an interactive schematic diagram of a method according to an embodiment of the present disclosure.

To further describe the examples of the disclosure, referring to FIG. 5, the voice interaction system in this example includes: a server, an intelligent device_A, an intelligent device_B, an intelligent device_C and an intelligent device_X. In this example, the method may further include the following steps:
  S1: a first intelligent device in the intelligent device_A, the intelligent device_B, the intelligent device_C and the intelligent device_X is determined.

For example, according to the performance of the intelligent devices, in this example, the intelligent device_X with the best performance is determined as the first intelligent device. Whether each intelligent device is the first intelligent device may be determined by the voice interaction system. Or the server determines the first intelligent device based on device information of each intelligent device. Whether the result is the first intelligent device needs to be informed to each intelligent device. Therefore, when the awakening event exists, each intelligent device may determine whether to be the first intelligent device according to the notification result, and may also determine the identification of the first intelligent device.

S2: when a user sends out a voice awakening word, the intelligent device determines that the voice awakening event exists. Each intelligent device may be in a status waiting for response, the first intelligent device generates a first awakening request and the second intelligent device generates a second awakening request.

S3: each intelligent device performs corresponding operations: the second intelligent device transmits the second awakening request to the server and the first intelligent device; and the first intelligent device receives the second awakening request transmitted by the second intelligent device and transmits its own first awakening request to the server.

S4: when the decision-making condition is met, the first intelligent device generates a first awakening result according to a first awakening request, a second awakening request of the second intelligent device and the preset decision-making rule. The server generates a second awakening result according to the first awakening request, the second awakening request and the preset decision-making rule.

S5: the first intelligent device transmits the first awakening result to the second intelligent device. The server transmits the second awakening result to each intelligent device.

S6: in combination with the decision-making rule, the awakening device will receive first awakening response data transmitted by the first intelligent device and second awakening response data transmitted by the server. The awakening inhibiting device will receive first awakening inhibiting data transmitted by the first intelligent device and second awakening inhibiting data transmitted by the server.

For example, in this example, if the device_A is an awakening device, an awakening operation may be performed according to the first awakening response data or the second awakening response data, that is, the awakening event may be answered. If the device_B and the device_C are awakening inhibiting devices, awakening inhibition may be performed according to the first awakening inhibiting data and the second awakening inhibiting data, that is, this awakening event may be ignored.

In the method of the disclosure, in combination with this example, the number of the awakening request transmitted in the interaction process may be effectively reduced. In this disclosure, the number of the transmitted awakening requests may be N*2−1. Compared with the distributed decision-making manner in related technologies, the number of the transmitted request data is reduced. In related technologies, the awakening request of each intelligent device needs to be transmitted to other intelligent devices one by one, and the number of the transmitted request data is N*(N−1). N represents the number of the intelligent devices. Therefore, the disclosure may greatly relieve the network pressure.

Figure 6:
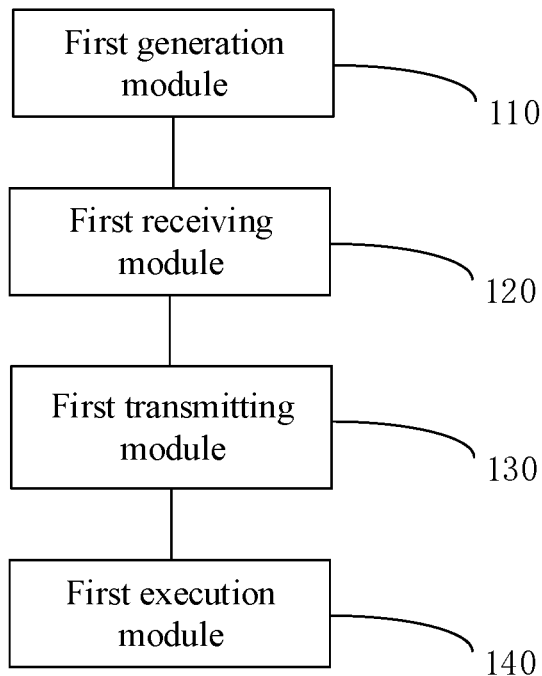
FIG. 6 is a block diagram of an apparatus according to an embodiment of the present disclosure.

In an exemplary example, the disclosure may further provide a voice collaborative awakening apparatus, which is applied to a first intelligent device of a plurality of intelligent devices. As shown in FIG. 6, the apparatus of this example includes: a first generation module, 110, a first receiving module 120, a first transmitting module 130 and a first execution module 140. The apparatus of this example is used to implement the method shown in FIG. 2. The first generation module 110 is configured to, in response to a voice awakening event, generate a first awakening request and transmit the first awakening request to a server. The first receiving module 120 is configured to receive a second awakening request transmitted by at least one second intelligent device, and each second awakening request is generated by the second intelligent device for transmitting the second awakening request in response to the voice awakening event. The first transmitting module 130 is configured to, if the decision-making condition is met, generate the first awakening result according to the preset decision-making rule, and transmit the first awakening result to each intelligent device. The first execution module 140 is configured to, if the first awakening result is generated, after the second awakening result returned by the server according to the first awakening request and the second awakening request is received, discard the first awakening result, and perform awakening or inhibit awakening according to the second awakening result. The first execution module 140 is further configured to, if the first awakening result is generated, before the second awakening result is received, perform awakening or inhibit awakening according to the first awakening result.

In this example, the first awakening request includes a unique identification of the first intelligent device, and the second awakening request includes a unique identification of the second intelligent device.

In this example, the apparatus further includes: a first determination module. The first determination module is configured to: determine a unique identification of each second intelligent device according to the received second awakening request; and determine that the decision-making condition is met if the unique identification of each second intelligent device is correspondingly matched with the prestored reference identification. The first determination module is further configured to: if the time of receiving the second awakening request exceeds a preset duration, determine that the decision-making condition is met.

In this example, the first awakening request and the second awakening request both includes a voice energy value, and the voice energy value is used to indicate sound energy of voice detected by a current device. The preset decision-making rule is: according to voice energy values in the first awakening request and each received second awakening request, the intelligent device corresponding to the awakening request with a maximum voice energy value is selected as an awakening device, and other intelligent devices serve as awakening inhibiting devices.

In this example, the first transmitting module 130 is configured to: transmit first awakening response data to the awakening device; and transmit first awakening inhibiting data to the awakening inhibiting device.

Figure 7:
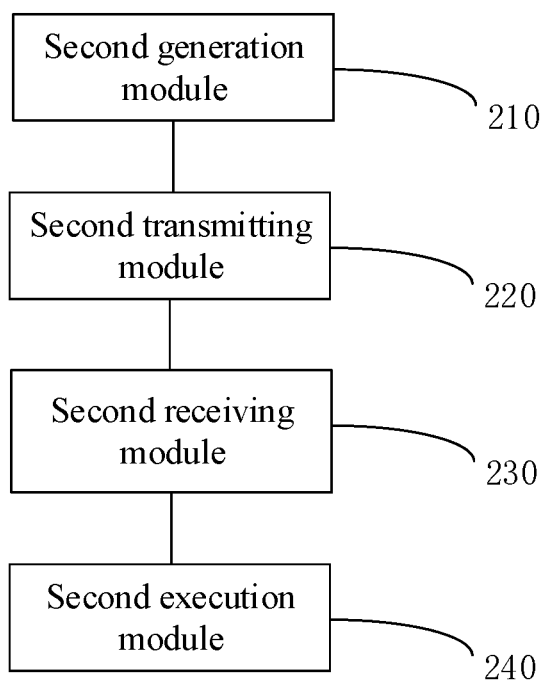
FIG. 7 is a block diagram of an apparatus according to an embodiment of the present disclosure.

In an exemplary example, the disclosure may further provide a voice collaborative awakening apparatus, which is applied to a second intelligent device of a plurality of intelligent devices. As shown in FIG. 7, the apparatus of this example includes: a second generation module 210, a second transmitting module 220, a second receiving module 230 and a second execution module 240. The apparatus of this example is used to implement the method shown in FIG. 3. The second generation module 210 is configured to, in response to a voice awakening event, generate a second awakening request. The second transmitting module 220 is configured to transmit the second awakening request to a first intelligent device and a server. The second receiving module 230 is configured to receive a first awakening result transmitted by the first intelligent device and receive a second awakening result transmitted by the server, where the first awakening result is generated by the first intelligent device according to the generated first awakening request, the second awakening request and the preset decision-making rule when the decision-making condition is met; and the second awakening result is generated by the server according to the second awakening request, the first awakening request and the preset decision-making rule. The second execution module 240 is configured to, if the first awakening result is received and then the second awakening result is received, discard the second awakening result and perform awakening or inhibit awakening according to the first awakening result. The second execution module 240 is further configured to, if the second awakening result is received and then the first awakening result is received, perform awakening or inhibit awakening according to the second awakening result.

In this example, the first awakening request includes a unique identification of the first intelligent device, and the second awakening request includes a unique identification of the second intelligent device.

In this example, the first awakening request and the second awakening request both include a voice energy value, and the voice energy value is used to indicate sound energy of voice detected by a current device The preset decision-making rule is: according to voice energy values in the first awakening request and each received second awakening request, the intelligent device corresponding to the awakening request with a maximum voice energy value is selected as an awakening device, and other intelligent devices serve as awakening inhibiting devices.

In this example, the second receiving module 230 is configured to: if it is an awakening device, receive first awakening response data transmitted by the first intelligent device; and if it is an awakening inhibiting device, receive first awakening inhibiting data transmitted by the first intelligent device. The second receiving module 230 is further configured to: if it is an awakening device, receive second awakening response data; and if it is an awakening inhibiting device, receive second awakening inhibiting data.

Figure 8:
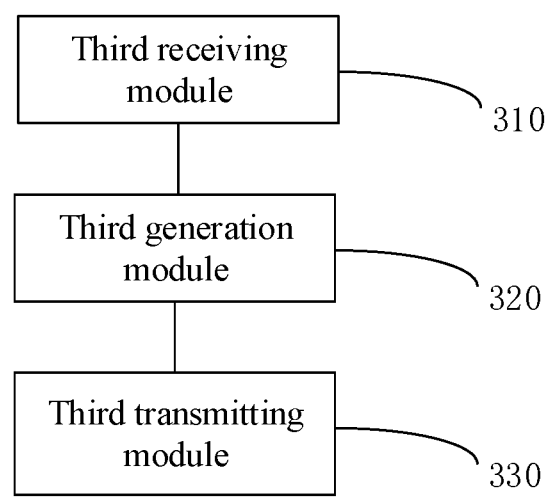
FIG. 8 is a block diagram of an apparatus according to an embodiment of the present disclosure.

In an exemplary example, the disclosure may further provide a voice collaborative awakening apparatus, which is applied to a server. As shown in FIG. 8, the apparatus of this example includes: a third receiving module 310, a third generation module 320 and a third transmitting module 330. The apparatus of this example is used to implement the method shown in FIG. 4. The third receiving module 310 is configured to receive the first awakening request transmitted by the first intelligent device and the second awakening request transmitted by the second intelligent device, where the first awakening request is generated by the first intelligent device in response to the voice awakening event, and the second awakening request is generated by the second intelligent device in response to the voice awakening event. The third generation module 320 is configured to, if a decision-making condition is met, generate a second awakening result according to a preset decision-making rule. The third transmitting module 330 is configured to transmit the second awakening result to the first intelligent device and the second intelligent device. The second intelligent device also receives a first awakening result. The first awakening result is generated by the first intelligent device according to the generated first awakening request, the second awakening request and the preset decision-making rule when the decision-making condition is met.

In this example, the first awakening request includes a unique identification of the first intelligent device, and the second awakening request includes a unique identification of the second intelligent device. The apparatus further includes: a second determination module. The second determination module is configured to: according to the received first awakening request and the second awakening request, determine the unique identification of the first intelligent device and the unique identification of the second intelligent device; and if each determined unique identification is correspondingly matched with the pre-stored reference identification, determine that the decision-making condition is met. The second determination module is further configured to: if the time of receiving the first awakening request and the second awakening request exceeds a preset duration, determine that the decision-making condition is met.

In this example, the first awakening request and the second awakening request both includes position information, and the position information is configured to indicate distance information between the current device and the user. The preset decision-making rule is: according to position information of the first awakening request and each received second awakening request, the intelligent device corresponding to the awakening request with the minimum distance information is selected as an awakening device, and other intelligent devices serve as awakening inhibiting devices.

In this example, the third transmitting module 330 is configured to: transmit second awakening response data to the awakening device; and transmit second awakening inhibiting data to the awakening inhibiting device.

Figure 9:
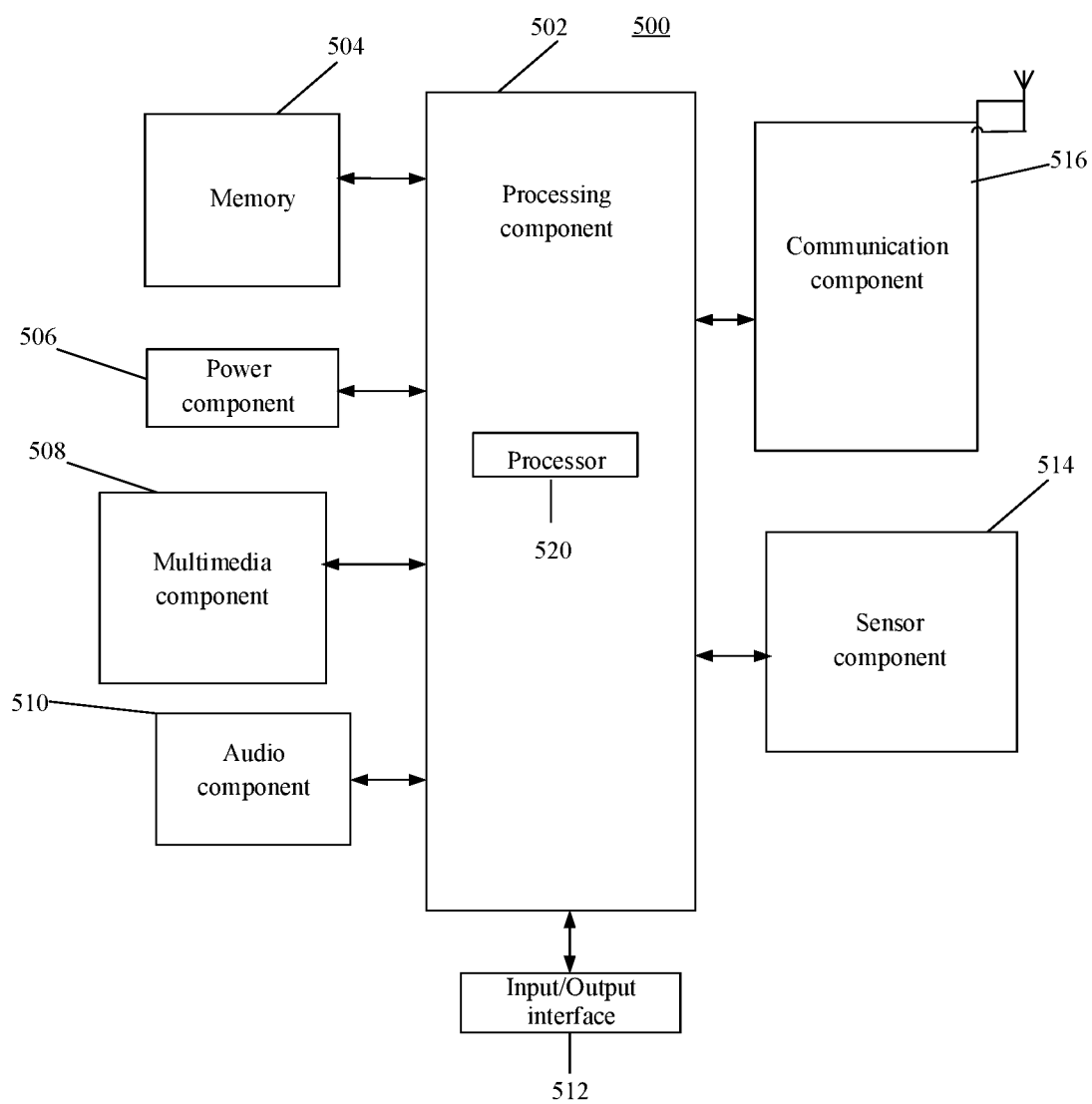
FIG. 9 is a block diagram of an electronic device according to an embodiment of the present disclosure.

As shown in FIG. 9, it is a block diagram of an electronic device. The disclosure further provides an electronic device. For example, the device 500 may be a mobile phone, a computer, a digital broadcasting terminal, a message receiving and sending device, a game console, a tablet device, a medical device, a fitness device, a personal digital assistant, etc.

The device 500 may include one or more of the following components: a processing component 502, a memory 504, a power component 506, a multimedia component 508, an audio component 510, an input/output (I/O) interface 512, a sensor component 514, and a communication component 516.

The processing component 502 usually determines the overall operation of the device 500, such as operations associated with display, telephone call, data communication, camera operation and recording operation. The processing component 502 may include one or more processors 520 to execute instructions to complete all of or part of the steps of the above method. In addition, the processing component 502 may include one or more modules to facilitate interaction between the processing component 502 and other components. For example, the processing component 502 may include a multimedia module to facilitate interaction between the multimedia component 508 and the processing component 502.

The memory 504 is configured to store various types of data to support the operation of the device 500. Examples of the data include instructions for any application program or method operated on the device 500, contact data, phone book data, messages, pictures, videos, etc. The memory 504 may be implemented by any type of volatile or non-volatile storage device or a combination thereof, such as a static random access memory (SRAM), an electrically erasable programmable read-only memory (EEPROM), an erasable. programmable read-only memory (EPROM), a programmable read-only memory (PROM), a read-only memory (ROM), a magnetic memory, a flash memory, a magnetic disk or an optical disk.

The power component 506 supplies power to various components of the device 500. The power component 506 may include a power management system, one or more power sources, and other components associated with power generation, management and distribution of the apparatus 500.

The multimedia component 508 includes a screen that provides an output interface between the device 500 and the user. In some examples, the screen may include a liquid crystal display (LCD) and a touch panel (TP). If the screen includes a touch panel, the screen may be implemented as a touch screen to receive input signals from the user. The touch panel includes one or more touch sensors to sense touches, slides and gestures on the touch panel. The touch sensor may sense not only the boundary of a touch or slide, but also the duration and pressure associated with the touch or slide. In some examples, the multimedia component 508 includes a front camera and/or a rear camera. When the device 500 is in an operation mode, such as a shooting mode or a video mode, the front camera and/or the rear camera may receive external multimedia data. Each front or rear camera may be a fixed optical lens system or have focal length and optical zoom capability.

The audio component 510 is configured to output and/or input audio signals. For example, the audio component 510 includes a microphone (MIC), which is configured to receive external audio signals when the device 500 is in an operation mode, such as a call mode, a recording mode and a voice recognition mode. The received audio signals may be further stored in the memory 504 or sent by the communication component 516. In some examples, the audio component 510 further includes a speaker for outputting audio signals.

The I/O interface 512 provides an interface between the processing component 502 and a peripheral interface module. The peripheral interface module may be a keyboard, a click wheel, a button, etc. The button may include but is not limited to a home button, a volume button, a start button and a lock button.

The sensor component 514 includes one or more sensors for providing various aspects of status assessment for the device 500. For example, the sensor component 514 may detect an on/off state of the device 500, and relative positions of components such as a display and a keypad of the device 500. The sensor component 514 may also detect a position change of the device 500 or one component of the device 500, presence or absence of contact between the user and the device 500, an orientation or acceleration/deceleration of the device 500 and a temperature change of the device 500. The sensor component 514 may include a proximity sensor configured to detect the presence of nearby objects without any physical contact. The sensor component 514 may also include an optical sensor, such as a CMOS or CCD image sensor, for use in imaging applications. In some examples, the sensor component 514 may also include an acceleration sensor, a gyro sensor, a magnetic sensor, a pressure sensor, or a temperature sensor.

The communication component 516 is configured to facilitate wired or wireless communication between the device 500 and other devices. The device 500 may access wireless networks based on communication standard, such as WiFi, 2G, 3G, or a combination thereof. In an exemplary example, the communication component 516 receives broadcast signals or broadcast associated information from an external broadcast management system via a broadcast channel. In an exemplary example, the communication component 516 further includes a near field communication (NFC) module to facilitate short range communication. For example, the NFC module may be implemented based on radio frequency identification (RFID) technology, infrared data association (IrDA) technology, ultra wide band (UWB) technology, Bluetooth (BT) technology, and other technologies.

In an exemplary example, the device 500 may be implemented by one or more application specific integrated circuits (ASICs), digital signal processors (DSPs), digital signal processing devices (DSPDs), programmable logic devices (PLDs), field programmable gate arrays (FPGAs), controllers, microcontrollers, microprocessors or other electronic components to perform the above method.

Another exemplary example of the disclosure provides a non-transitory computer-readable storage medium, such as a memory 504 including instructions, and the instructions are executable by the processor 520 of the device 500 to complete the above method. For example, the computer-readable storage medium may be an ROM, a random access memory (RAM), a CD-ROM, a magnetic tape, a floppy disk, an optical data storage device, etc. When the instruction in the storage medium is executed by the processor of the electronic device, the electronic device can perform the above method.

After considering the specification and practicing the disclosure disclosed herein, those skilled in the art would readily conceive of other examples of the present disclosure. The disclosure is intended to cover any variations, uses or adaptive changes of the present disclosure. These variations, uses or adaptive changes follow the general principle of the present disclosure and include common general knowledge or conventional technical means in the technical field that are not disclosed in the disclosure. The specification and the examples are merely regarded as exemplary, and the real scope and spirit of the present disclosure are indicated by the following claims.

It should be understood that the present disclosure are not limited to the precise structure described above and shown in the drawings, and various modifications and changes may be made without departing from its scope. The scope of the present disclosure is limited only by the appended claims.

The invention claimed is:

1. A voice collaborative awakening method, wherein the voice collaborative awakening method is applied to a first intelligent device of a plurality of intelligent devices and comprises:
generating a first awakening request and transmitting the first awakening request to a server in response to a voice awakening event;
receiving a second awakening request transmitted by a second intelligent device, where the second awakening request is generated by the second intelligent device for transmitting the second awakening request in response to the voice awakening event;

generating the first awakening request according to a preset decision-making rule, and transmitting a first awakening result to each intelligent device when a decision-making condition is met;

discarding the first awakening result and performing awakening or inhibiting awakening according to a second awakening result when the first awakening result is generated, after receiving the second awakening request returned by the server according to the first awakening request and the second awakening request; and performing awakening or inhibiting awakening according to the first awakening result when the first awakening result is generated, before receiving the second awakening result.

2. The voice collaborative awakening method according to claim 1, wherein the first awakening request comprises a unique identification of the first intelligent device, and the second awakening request comprises a unique identification of the second intelligent device.

3. The voice collaborative awakening method according to claim 2, further comprising:

determining the unique identification of the second intelligent device according to the received second awakening request; and determining that the decision-making condition is met if the unique identification of each second intelligent device is correspondingly matched with a pre-stored reference identification.

4. The voice collaborative awakening method according to claim 1, further comprising:

determining that the decision-making condition is met when a time of receiving the second awakening request exceeds a preset duration.

5. The voice collaborative awakening method according to claim 1, wherein the first awakening request and the second awakening request both comprise a voice energy value, and the voice energy value is used to indicate sound energy of a voice detected by a current device.

6. The voice collaborative awakening method according to claim 5, wherein the preset decision-making rule is: according to voice energy values in the first awakening request and the received second awakening request, one of the plurality of intelligent devices corresponding to the awakening request with a maximum voice energy value is selected as an awakening device, and others of the plurality of intelligent devices serve as awakening inhibiting devices.

7. The voice collaborative awakening method according to claim 5, wherein generating the first awakening result according to a preset decision-making rule and transmitting the first awakening result to each intelligent device comprises:

transmitting first awakening response data to an awakening device; and transmitting first awakening inhibiting data to an awakening inhibiting device.

8. A voice collaborative awakening method, wherein the voice collaborative awakening method is applied to a second intelligent device of a plurality of intelligent devices and comprises:

generating a second awakening request in response to a voice awakening event;

transmitting the second awakening request to a first intelligent device and a server;

receiving a first awakening result transmitted by the first intelligent device and receiving a second awakening result transmitted by the server, where the first awakening result is generated by the first intelligent device according to a generated first awakening request, the second awakening request and a preset decision-making rule when a decision-making condition is met, and the second awakening result is generated by the server according to the second awakening request, the first awakening request and the preset decision-making rule;

discarding the second awakening result and performing awakening or inhibiting awakening according to the first awakening result when the first awakening result is received and then the second awakening result is received; and performing awakening or inhibiting awakening according to the second awakening result when the second awakening result is received and then the first awakening result is received.

9. The voice collaborative awakening method according to claim 8, wherein the first awakening request comprises a unique identification of the first intelligent device, and the second awakening request comprises a unique identification of the second intelligent device.

10. The voice collaborative awakening method according to claim 8, wherein the first awakening request and the second awakening request both comprise a voice energy value, and the voice energy value is used to indicate sound energy of voice detected by a current device;

the preset decision-making rule is: according to voice energy values in the first awakening request and the received second awakening request, one of the plurality of intelligent devices corresponding to the awakening request with a maximum voice energy value is selected as an awakening device, and others of the plurality of intelligent devices serve as awakening inhibiting devices.

11. The voice collaborative awakening method of claim 10, wherein receiving the first awakening result transmitted by the first intelligent device comprises:

receiving first awakening response data transmitted by the first intelligent device if it is an awakening device; and receiving first awakening inhibiting data transmitted by the first intelligent device if it is an awakening inhibiting device.

12. The voice collaborative awakening method according to claim 10, wherein receiving the second awakening result transmitted by the server comprises:

receiving second awakening response data if it is an awakening device; and receiving second awakening inhibiting data if it is an awakening inhibiting device.

13. A voice collaborative awakening method, wherein the voice collaborative awakening method is applied to a server and comprises:

receiving a first awakening request transmitted by a first intelligent device and a second awakening request transmitted by a second intelligent device, the first awakening request being generated by the first intelligent device in response to a voice awakening event, and the second awakening request being generated by the second intelligent device in response to the voice awakening event;

generating a second awakening result according to a preset decision-making rule when a decision-making condition is met; and transmitting the second awakening result to the first intelligent device and the second intelligent device, where the second intelligent device also receives a first awakening result, and the first awakening result is generated by the first intelligent device according to the generated first awakening request, the second awakening request and the preset decision-making rule when the decision-making condition is met.

14. The voice collaborative awakening method according to claim 13, wherein the first awakening request comprises a unique identification of the first intelligent device, and the second awakening request comprises a unique identification of the second intelligent device;

the method further comprising:

according to the received first awakening request and the second awakening request, determining the unique identification of the first intelligent device and the unique identification of the second intelligent device; and determining that the decision-making condition is met if each determined unique identification is respectively matched with a pre-stored reference identification.

15. The voice collaborative awakening method according to claim 13, further comprising:

determining that the decision-making condition is met when a time of receiving the first awakening request and the second awakening request exceeds a preset duration.

16. The voice collaborative awakening method according to claim 13, wherein the first awakening request and the second awakening request both comprise position information, and the position information is used to indicate distance information between a current device and a user;

the preset decision-making rule is: according to position information in the first awakening request and the received second awakening request, one of the plurality of intelligent devices corresponding to the awakening request with minimum distance information is selected as an awakening device, and others of the plurality of intelligent devices serve as awakening inhibiting devices.

17. The voice collaborative awakening method according to claim 16, wherein transmitting the second awakening result to the first intelligent device and the second intelligent device comprises:

transmitting second awakening response data to the awakening device; and transmitting second awakening inhibiting data to an awakening inhibiting device.

18. An electronic device, comprising:

a processor; and a memory for storing processor executable instructions;

wherein the processor is configured to perform the voice collaborative awakening method according to claim 1 when executing the processor executable instructions.

19. An electronic device, comprising:

a processor; and a memory for storing processor executable instructions;

wherein the processor is configured to perform the voice collaborative awakening method according to claim 8 when executing the processor executable instructions.

20. An electronic device, comprising:

a processor; and a memory for storing processor executable instructions;

wherein the processor is configured to perform the voice collaborative awakening method according to claim 13 when executing the processor executable instructions.

* * * * *